United States Patent [19]
Schmitt et al.

[11] Patent Number: 5,593,217
[45] Date of Patent: Jan. 14, 1997

[54] TRACTION CONTROL SYSTEM

[75] Inventors: Johannes Schmitt, Markgroeningen, Germany; Andreas Burg, Clayton, Australia; Ralf Donath, Ditzingen, Germany

[73] Assignee: Robert Bosch GmbH, Stuttgart, Germany

[21] Appl. No.: 531,206

[22] Filed: Sep. 19, 1995

[30] Foreign Application Priority Data

Sep. 20, 1994 [DE] Germany .......................... 44 33 460.5

[51] Int. Cl.⁶ .............. B60T 8/32; B60K 28/16; B60Q 9/00
[52] U.S. Cl. .............. 303/139; 188/1.11; 303/140; 303/141; 303/146; 303/138; 303/122.01
[58] Field of Search .................... 303/138, 139, 303/122.01, 113.2, 113.3, 199, 133, 146, 122, 122.02, 141, 142, 140, 147, 148, 156, 163, 169; 364/426.01, 426.02, 426.03; 188/181 A, 181 C, 1.11; 180/197

[56] References Cited

U.S. PATENT DOCUMENTS

| | | | |
|---|---|---|---|
| 4,702,336 | 10/1987 | Seibert et al. | 303/138 |
| 4,876,525 | 10/1989 | Gross | 188/1.11 E |
| 5,139,115 | 8/1992 | Browne et al. | 188/1.11 E |
| 5,236,254 | 8/1993 | Müller et al. | 188/1.11 E |
| 5,280,718 | 1/1994 | Drake et al. | 188/1.11 E |
| 5,544,949 | 8/1996 | Schmitt et al. | 303/145 |

OTHER PUBLICATIONS

Automobil Revue 85 (1990) 6, p. 25.

*Primary Examiner*—Douglas C. Butler
*Attorney, Agent, or Firm*—Felfe & Lynch

[57] ABSTRACT

An information lamp flashes when instability is detected, whether the system is switched on, off or limited in its functional scope. When the traction control system is switched off or limited in its functional scope and no instability is detected, the lamp lights up continuously.

7 Claims, 3 Drawing Sheets

TRACTION CONTROL SYSTEM

PRIOR ART

The invention relates to a traction control system. Such a traction control system is known for example from the publication "Automobile Revue 85 (1990) 6, page 25. The traction control system presented there has a monitoring lamp for informing the driver about the state of the traction control system, which monitoring lamp flashes in the fault state, for example in the case of overheated brakes and/or failed traction controller and lights up when the traction controller is activated as a result of an unstable driving state.

In addition, it is known, in conjunction with traction control systems, to actuate an information lamp so as to flash when a slip state occurs when the traction control system is switched on and to indicate a manually switched-off traction controller by the information lamp lighting up.

The known driver information does not take into account the occurrence of unstable driving states when a traction controller is switched off by the driver.

Therefore, it is an object of the invention to improve the information supplied to the driver about the respective operating state of a traction control system and about the occurrence of driving states without increased expenditure.

SUMMARY OF THE INVENTION

According to the invention, a conventional first traction controller which affects drive torque and brake pressure can be switched off by the driver. When this is done, a lamp is lit continuously to inform the driver. When instability of a drive wheel occurs, the lamp flashes whether or not the first traction controller is switched off. In a preferred embodiment, a second traction controller is switched on when the first traction controller is switched off. This acts only on the brakes to provide a locking differential effect.

The procedure according to the invention has the advantage that the driver is informed both about the operating states of the traction controller and the occurrence of driving states. In particular, by appropriately activating an information lamp, the driver is supplied with information about the occurrence of an unstable driving state even when the traction controller is switched off.

In addition, the driver is advantageously informed that the automatic control of the driving stability is no longer available because of the switching off of the traction controller. In addition, he is notified of the intervention of the traction controller in the case of instabilities and in the case of excessive slip.

It is particularly advantageous that only one information lamp is required to inform the driver in this comprehensive way.

BRIEF DESCRIPTION OF THE DRAWING

FIG. 1 shows an overview block circuit diagram of a traction control system while

DESCRIPTION OF EXEMPLARY EMBODIMENTS

Figure 1:
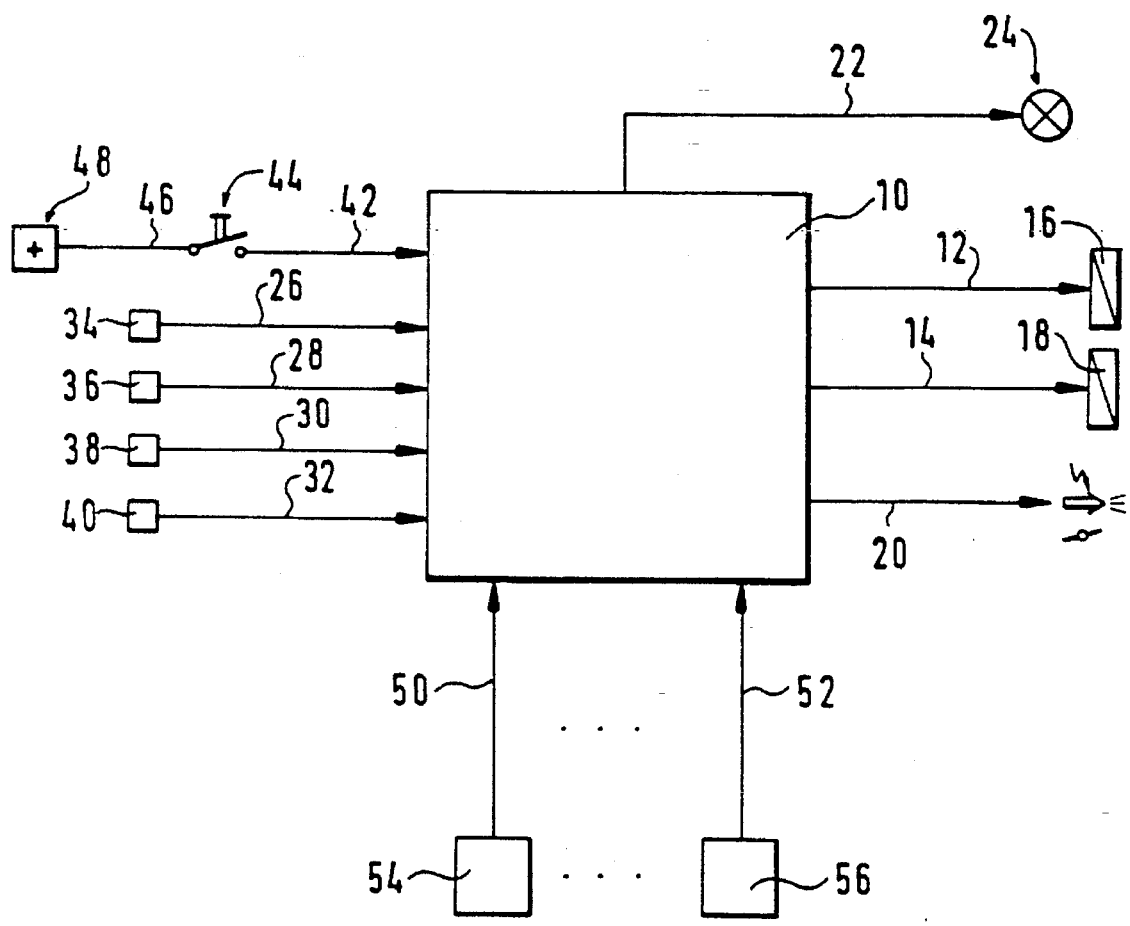

FIG. 1 shows a control unit 10 which actuates the solenoid valves 16 and 18 via the output lines 12 and 14 in order to control the brakes of at least two driving wheels. Via the output line 20, the control unit 10 influences the power of the drive unit of the vehicle by means of the metering of fuel, adjustment of the ignition time and/or by means of the air supply. In addition, the control unit 10 has an output line 22 with which it drives an information lamp or warning lamp 24. Input lines 26, 28, 30 and 32 which connect the control unit 10 to sensors 34, 36, 38 and 40 and an input line 42 is provided which connects the control unit 10 to a switch/pushbutton 44 which can be activated by the driver and is connected to a voltage source 48 via the line 46. In addition input lines 50 to 52 are provided which connect the control unit 10 to measuring devices 54 to 56 in order to detect further operating variables of the engine (such as engine speed and air flow) and/or of the vehicle.

In the preferred exemplary embodiment the control unit 10, comprises a traction controller which controls the slip at the driving wheels by influencing the wheel brakes and the driving torque of the vehicle with the effect of stabilizing the vehicle and improving traction to prescribed values. In the preferred exemplary embodiment this traction controller can be switched off by the driver by activating the switch 44. When the traction controller is switched off, a locking differential effect is maintained by the brakes in order to improve traction, i.e. a control of the locking torque of the differential of the vehicle is maintained. Despite the fact that the traction controller is switched off, traction monitoring can be maintained in this way. The basic principle of the control of the locking torque by intervening in the wheel brakes is that the build up of braking pressure at the wheel which becomes unstable later is not permitted until the braking pressure in the brake of the wheel which becomes unstable first has dropped below a prescribed minimum pressure. Such a limitation of the traction control mode is described more completely in U.S. Pat. No. 5,544,949 incorporated herein by reference.

When the traction controller is switched off (and the blocking differential effect is possibly present) in such a traction control system, the information lamp 24 is actuated with a prescribed voltage level so that the driver is informed about the switching off and the possible occurrence of driving state instabilities by the lamp lighting up. The information lamp flashes when the traction controller is switched off, possibly with the locking differential effect being maintained, if one or more unstable driving wheels are detected. By means of this measure the attention of the driver is drawn to the critical driving situation i.e. the impending driving instability, even in this operating state. There is then also provision for the information lamp to flash if the traction controller intervenes because of instability.

Figure 2:
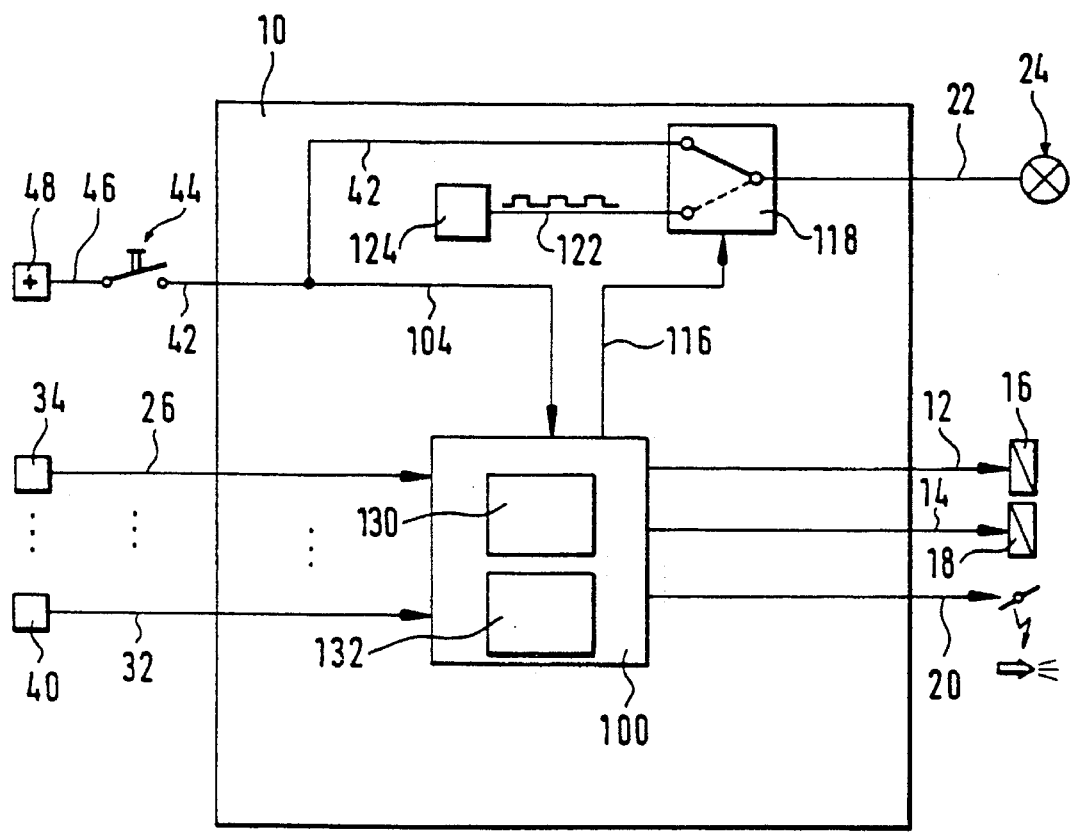
FIG. 2 shows a block circuit diagram of the lamp actuation according to the invention.

An exemplary embodiment of the actuation of the information lamp is illustrated in FIG. 2. Here, the components which are designated and described with reference to FIG. 1 are no longer described in greater detail.

The control unit 10 comprises a traction control system 100 to which the lines 26 to 32 from the measuring devices 34 to 40 and possibly, in supplementary way, the input lines 50 to 52 are led. The output lines of the traction control system 100 are the lines 12 and 14 which lead to the brake valves 16 and 18 which are assigned to the driving wheels and the line 20 for influencing the power of the engine. In addition, a line 104 is led from the line 42 to the traction control system 100. A further output line 116 of the traction control system leads to the control input of a switching element 118. One input line of the switching element 118 constitutes the line 42 and the other input line forms the line 122 which starts from a clock signal generator 124. The output line of the switching element 118 is the line 22 which leads to the information lamp 24. In a preferred exemplary embodiment the traction control system comprises a traction controller 130 for controlling the drive slip in order to improve the traction and the driving stability of the vehicle and a locking torque controller 132 for providing a locking differential effect at the driving wheels in order to improve the traction of the vehicle.

In a known fashion the traction controller and the locking torque controller identify the tendency of a driving wheel to spin on the basis of the reference speed of the vehicle and the speed of a driving wheel taking into account the acceptable slip. In the event of instability, a control error is formed which is reduced by the traction controller 130 with the effect of adjusting the speed or the slip of the driving wheel or wheels to the prescribed desired value by activating the brake valves 16 and 18 and/or by influencing the power of the engine. The traction controller 130 can be switched off and on by means of the switch 44 which can be activated by the driver. In a preferred exemplary embodiment, when the switch 44 is activated the traction controller 130 is switched off and the locking torque controller 132 is activated. In order to improve the traction on the basis of the control error, the locking torque controller prevents the spinning of a driving wheel by activating the associated brake valve 16 or 18 when a tendency of the wheel to spin is detected (e.g. positive control error). Here, the driving stability is no longer influenced so that instabilities and undesired driving situations can occur in this operating state.

In order to inform the driver about the switched-off traction controller 130 and the associated limitations, when the switch 44 is activated the information lamp 24 is supplied with current via the switching element 118 and line 22 from the voltage source 48. When the traction controller is switched off or the traction control mode is limited, the information lamp accordingly lights up. However, if a positive control error (tendency of at least one driving wheel to spin) is identified in the traction control system, i.e. at least one unstable wheel is detected, the switching element 118 is switched over via the line 116 into the position shown by broken lines. As a result, a clock signal which is produced by the clock generator 124 is fed to the information lamp 24. Therefore, the information lamp flashes in accordance with the pulse signal prescribed by the clock signal generator 124. When there is a tendency of at least one driving wheel to spin or when there is instability with at least one driving wheel, the driver is accordingly informed by the flashing information lamp irrespective of the switching state of the switch 44. This means that even when the traction controller is switched off or the traction control mode is limited, the driver is informed of a hazardous situation which may be brought about by the instability.

Figure 3:
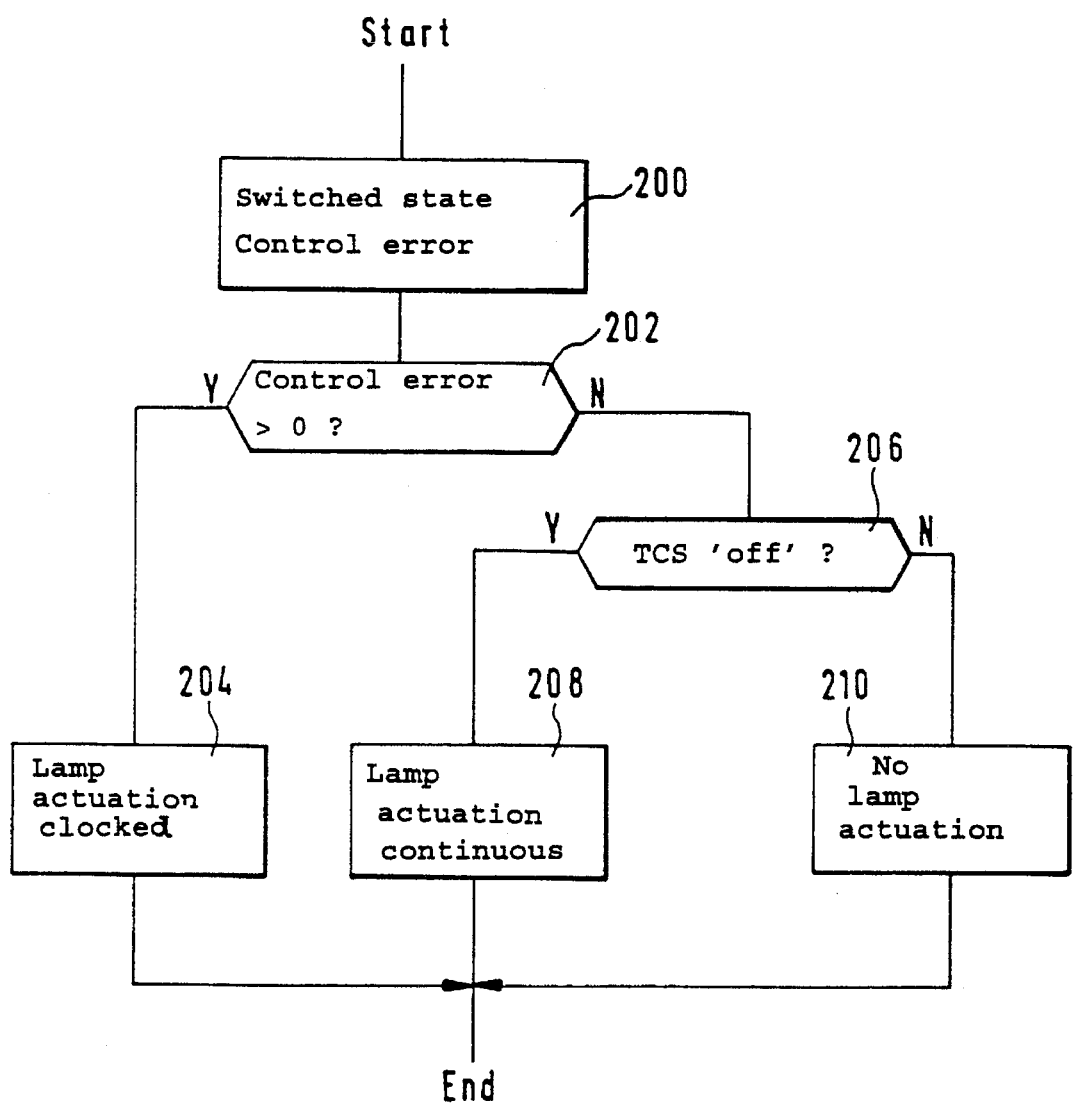
FIG. 3 shows a flow diagram as an exemplary way of realizing the procedure according to the invention by means of a computing program.

A representation as a computing program is shown with reference to the flow diagram illustrated in FIG. 3, the switching element 118 being part of this program. After the part of the program is started at prescribed time intervals, in step 200 the switch state and the control error are read in and in the following step 202 it is checked whether the control error is greater than zero, i.e. whether one or more unstable driving wheels are present. If this is the case, according to step 204 the information lamp is actuated in a clocked fashion and the part of the program is terminated. If no control error is detected in step 202, the switch state is checked in step 206 to determine whether the traction controller 130 is switched off or the traction control system 100 is only available to a limited degree. If this is the case, according to step 208 the lamp is actuated with a prescribed voltage so that it lights up continuously while in the opposite case no actuation of the lamp takes place (step 210). After this, and after step 208, the part of the program is terminated.

In the preferred exemplary embodiment the locking torque controller 132, which is activated by the switch 44 instead of the traction controller 130, is only active up to a predetermined speed threshold. In a preferred exemplary embodiment, the lamp actuation which indicates a slip state is therefore only carried out up to this speed limit.

In summary, it is therefore to be noted that when the traction controller is switched off or when the traction control mode is limited the information lamp lights up in order to inform the driver about the switched-off or limited traction control. The information lamp flashes both when the traction control system is switched on and when it is switched off/limited, if one or more unstable driving wheels is detected. The flashing information lamp indicates to the driver the critical driving situation occurring then.

We claim:

1. Apparatus for controlling slippage of driving wheels in a vehicle having an engine which develops torque to drive said wheels and brakes at each wheel, said apparatus comprising means for detecting instability at said driving wheels, first traction control means for at least one of limiting engine torque and applying brake pressure at the wheels where instability is detected, means for switching off the first traction control means, monitoring means for providing the driver with information about the operating state of the vehicle, said monitoring means having three different states comprising a first state which is activated when the first traction control means is switched off and no instability is detected, a second state which is activated when instability is detected, and a third state which is activated when the first traction control means is switched on and no instability is detected.

2. Apparatus as in claim 1 wherein said means for switching off the first traction control means is a switch activated by the driver.

3. Apparatus as in claim 1 further comprising second traction control means which does not limit engine torque, said second traction control means only limiting brake pressure at a driving wheel where instability is detected, said second traction control means being active only when said first traction control means is switched off.

4. Apparatus as in claim 3 wherein said second traction control means, when active, provides a locking differential effect at the driving wheels.

5. Apparatus as in claim 3 wherein said second traction control means is only active when said vehicle has a speed which is below a threshold speed.

6. Apparatus as in claim 3 wherein said monitoring means is in said second state only when said vehicle speed is below said threshold speed.

7. Apparatus as in claim 1, wherein said monitoring means comprises a lamp, said lamp being on continuously in said first state, on in pulsed fashion in said second state, and off in said third state.

* * * * *